United States Patent [19]

Hellerbach et al.

[11] 3,927,010

[45] Dec. 16, 1975

[54] DIARYLMETHANE DERIVATIVES AND PROCESSES FOR THEIR PREPARATION

[75] Inventors: Joseph Hellerbach; André Szente, both of Basel, Switzerland

[73] Assignee: Hoffman-La Roche Inc., Nutley, N.J.

[22] Filed: Aug. 8, 1973

[21] Appl. No.: 386,666

Related U.S. Application Data

[62] Division of Ser. No. 78,938, Oct. 7, 1970, abandoned.

[30] Foreign Application Priority Data

Oct. 17, 1969 Switzerland.................. 15533/69
Jan. 27, 1970 Switzerland.................. 1103/70

[52] U.S. Cl..................260/296 R; 260/239 BD; 260/239.3 D; 260/295 F; 260/295 AM; 260/295 CA; 260/295.5 A; 260/295.5 C; 260/338; 260/340.7; 260/340.9; 260/471 C; 260/562 N; 260/570 AB; 424/263; 424/330

[51] Int. Cl.² ..................................... C07D 213/74
[58] Field of Search................... 260/296 R, 570 AB

[56] References Cited
UNITED STATES PATENTS

| | | | |
|---|---|---|---|
| 3,413,346 | 11/1968 | Fryer et al.................. | 260/570 AB |
| 3,431,304 | 3/1969 | Fryer et al.................. | 260/570 AB |
| 3,646,011 | 2/1972 | Archer et al............... | 260/239 BD |
| 3,686,308 | 8/1972 | Ning et al.................... | 260/570 AB |

*Primary Examiner*—Alan L. Rotman
*Attorney, Agent, or Firm*—Samuel L. Welt; Bernard S. Leon; Frank P. Hoffman

[57] ABSTRACT

Diarylmethane derivatives and processes for their preparation are described. These compounds are useful as anti-convulsants, muscle relaxants and sedatives.

2 Claims, No Drawings

DIARYLMETHANE DERIVATIVES AND PROCESSES FOR THEIR PREPARATION

This is a division of application Ser. No. 78,938 filed Oct. 7, 1970, now abandoned.

DESCRIPTION OF THE INVENTION

The present invention relates to novel chemical compounds and to processes for the preparation thereof, said compounds having valuable therapeutic properties. More particularly, the present invention is concerned with new diarylmethane derivatives of the general formula

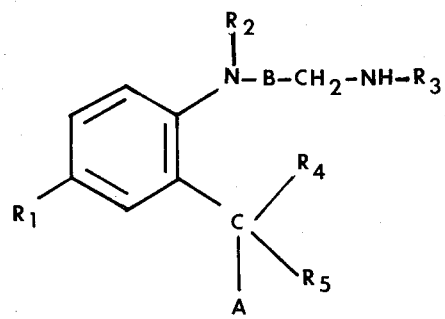

I wherein $R_1$ signifies halogen, nitro or trifluoromethyl; $R_2$ signifies hydrogen, lower alkyl, hydroxy-lower alkyl or di-lower alkylamino-lower alkyl; $R_3$ signifies hydrogen or lower alkoxycarbonyl; $R_4$ and $R_5$ each independently signify lower alkoxy or taken together signify lower alkylenedioxy or, provided that $R_3$ represents lower alkoxycarbonyl, taken together signify an oxo group; A represents phenyl, halophenyl or pyridyl; and B represents a carbonyl or methylene group and the pharmaceutically acceptable acid addition salts of those compounds of formula I which are basic in nature.

As used herein, either alone or in combination, the term "lower alkyl" denotes a straight or branched chain hydrocarbon group having from 1 to 7, preferably from 1 to 4 carbon atoms, such as methyl, ethyl, n-propyl, isobutyl and the like. The term "hydroxy-lower alkyl" denotes hydroxy substituted lower alkyl groups containing 2 or 3 carbon atoms such as 2-hydroxyethyl, 3-hydroxypropyl and the like. The term "di-lower alkylamino-lower alkyl" denotes amino-substituted lower alkyl groups containing 2 or 3 carbon atoms wherein the amino group is substituted by two lower alkyl groups such as, for example, diethylaminoethyl, diethylaminopropyl and the like. The term "lower alkoxy" denotes straight or branched chain saturated hydrocarbonoxy groups containing from 1 to 7, preferably 1 to 4 carbon atoms, such as methoxy, ethoxy, propoxy and the like. The term "lower alkylenedioxy" denotes a group of the formula -O- alkylene-O- in which the alkylene group is straight or branched chain and contains from 2 to 6 carbon atoms. The term "hydroxy-lower alkoxy" denotes a hydroxy substituted lower alkoxy group containing from 2 to 6 carbon atoms. The term "halogen" denotes fluorine, chlorine, bromine and iodine unless expressly indicated otherwise.

A particular class of compounds falling within the scope of formula I are those wherein $R_3$ signifes hydrogen, i.e. compounds of the formula

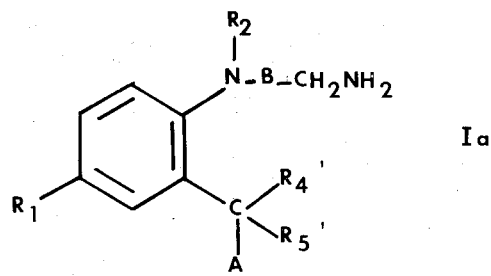

Ia wherein $R_1$, $R_2$, A and B are as above and $R_4'$ and $R_5'$ each independently signify lower alkoxy or taken together signify lower alkylenedioxy and pharmaceutically acceptable acid addition salts thereof.

A further particular class of compounds are those falling within the scope of formula Ia wherein $R_2$ signifies lower alkyl, hydroxy-lower alkyl or di-lower alkylamino-lower alkyl.

Another particular class of compounds falling within the scope of formula I are those wherein $R_3$ signifies lower alkoxycarbonyl, i.e. compounds of the formula

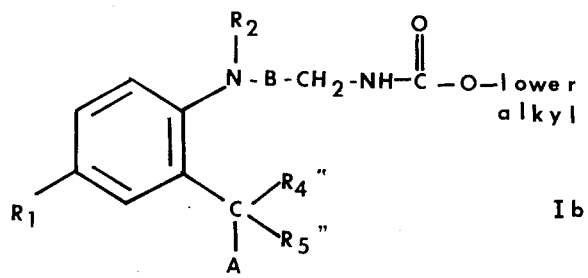

Ib wherein $R_1$, $R_2$, A and B are as described above and $R_4''$ and $R_5''$ each independently signify lower alkoxy or taken together signify lower alkylenedioxy or oxo and pharmaceutically acceptable acid addition salts of the compounds of formula Ib which are basic in nature.

A further particular class of compounds are those falling within the scope of formula Ib wherein $R_4$ and $R_5$ taken together signify an oxo group, i.e. compounds of the formula

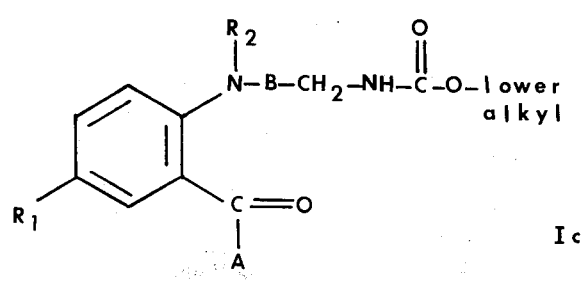

Ic wherein $R_1$, $R_2$, A and B are as above and pharmaceutically acceptable acid addition salts of the compounds of formula Ic which are basic in nature.

Especially preferred of the compounds of formula I are those wherein $R_1$ signifies nitro or halogen, preferably chlorine or bromine; wherein $R_2$ is hydrogen, methyl, hydroxyethyl, dimethylaminoethyl, or diethylaminoethyl; and wherein A signifies phenyl, o-halophenyl, preferably o-chlorophenyl or o-fluorophenyl, or 2-pyridyl. When $R_4$ or $R_5$ are lower alkoxy groups, methoxy or ethoxy are preferred and when $R_4$ and $R_5$ taken together signify a lower alkylenedioxy group, ethylenedioxy is preferred. When $R_3$ signifies a lower alkoxy carbonyl group, methoxy carbonyl and ethoxy carbonyl are preferred.

Most preferred of the compounds of formula I are:
Methyl [(2-benzoyl-4-chlorophenyl)methylcarbamoyl]methyl carbamate;
Methyl [(2-benzoyl-4-nitrophenyl)-methylcarbamoyl]methyl carbamate;
Methyl [[4-chloro-2-(o-fluorobenzoyl) phenyl]-methylcarbamoyl]methyl carbamate;
2-Amino-4'-chloro-2'-($\alpha$,$\alpha$-diethoxybenzyl)N-methylacetanilide;
N-[4-chloro-2-($\alpha$,$\alpha$-diethoxybenzyl)phenyl]-N-methylethylenediamine and
Methyl [[2-(o-chlorobenzoyl)-4-nitrophenyl]-methylcarbamoyl]methyl carbamate.

The novel compounds of formula I can be prepared following a variety of synthetic routes.

A. In one such process aspect, the compounds of formula Ic above may be prepared by treating a compound of the general formula

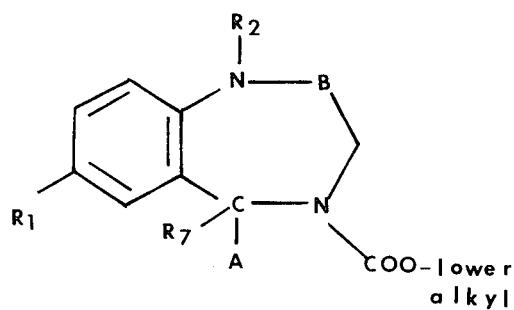

wherein $R_1$, $R_2$, A and B are as described above and $R_7$ signifies hydroxy, lower alkoxy, or hydroxy-lower alkoxy
with aqueous acid.

The reaction of a compound of formula II with an aqueous acid to prepare a compound of formula Ic is preferably effected for short time periods at elevated temperatures, with the preferred temperature in the range of from about 75° to about 100°C. Suitable acids for the purpose of this process aspect include mineral acids such as hydrochloric acid and sulfuric acid and organic sulfonic acids such as p-toluene sulfonic acid; with 4 to 8 N HCl being the preferred acid.

The starting materials of formula II above are novel and therefore form a part of the present invention. These novel benzodiazepine derivatives can be prepared from compounds of the general formula

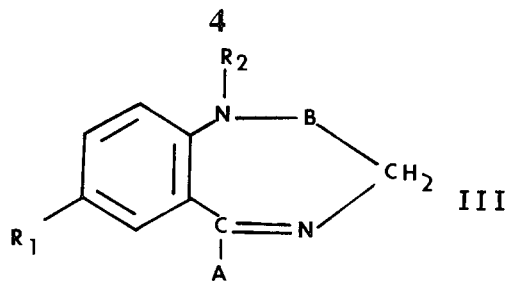

wherein $R_1$, $R_2$, A and B are as described above.

For example, a compound of formula III above can be reacted with a lower alkyl ester of chloroformic acid in the presence of water to yield a compound of formula II wherein $R_7$ signifies a hydroxy group. It is preferable to conduct this reaction in a mixture of an organic solvent, such as benzene, methylene chloride and the like, and an aqueous sodium bicarbonate solution.

The compounds of formula II above wherein $R_7$ signifies lower alkoxy or hydroxy-lower alkoxy can be prepared by the treatment of a compound of formula III above under anhydrous conditions with a lower alkyl ester of chloroformic acid and a lower alkanol or alkylene glycol.

The compounds of formula II need not be isolated or separated from the reaction medium in which they are prepared before their use in the preparation of the compounds of formula I since under the conditions used for their preparation, they can frequently be converted directly to the desired compounds of formula I.

B. In a further process aspect of the present invention, the compounds of formula Ib wherein $R_4''$ and $R_5''$ each independently signify lower alkoxy, i.e. compounds of the formula

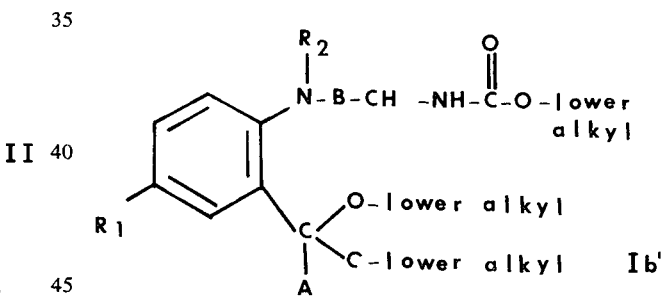

wherein $R_1$, $R_2$, A and B are as described above
can be prepared by treating a compound of the formula

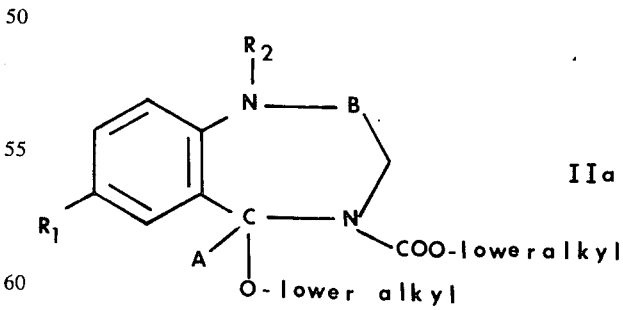

wherein $R_1$, $R_2$, A and B are as described above
in an anhydrous lower alkanol with an anhydrous acid. Suitable acids for the purpose of this process aspect include mineral acids such as hydrochloric acid and sulfuric acid and organic sulfonic acids such as p-toluene sulfonic acid. Suitable lower alkanols for the purpose include methanol, ethanol, propanol, iso-propanol and the like. The temperature and pressure employed are not critical to the successful performance of this process aspect. Thus, for convenience sake, the reaction is conducted at room temperature and atmospheric pressure. Depending upon the nature of the lower alkoxy group in the 5-position of the compounds of formula IIa and of the lower alkanol used, compounds of formula Ib which bear similar or different lower alkoxy groups can be obtained. If, in following the process aspect, only a small amount of water is present, there is obtained, at least as a side-product, a compound of formula Ib wherein $R_4''$ and $R_5''$ taken together represent an oxo group.

C. In another process aspect of the present invention, the compounds of formula Ib wherein $R_4''$ and $R_5''$ taken together signify a lower alkylenedioxy group can be prepared by treating a compound of the formula

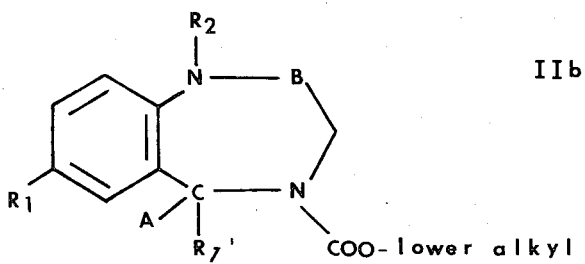

IIb wherein $R_1$, $R_2$, A and B are as described above and $R_7'$ signifies hydroxy-lower alkoxy
under anhydrous condition with an acid. The reaction between the compounds of formula IIb above and an anhydrous acid is preferably effected in the presence of an inert organic solvent. Suitable solvents for this purpose include the lower alkylene glycol corresponding to the residue $R_7'$, aromatic hydrocarbons such as benzene, toluene and the like, and halogenated hydrocarbons such as methylene chloride. If in the process aspect, a small amount of water is present, there is obtained as a side product a compound of formula Ib wherein $R_4''$ and $R_5''$ taken together signify an oxo group.

D. In a further process aspect of the present invention, compounds of formula Ib are prepared by reacting a compound of the general formula

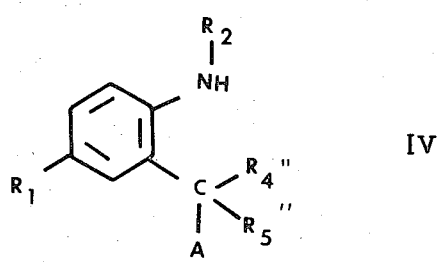

IV wherein $R_1$, $R_2$, $R_4''$, $R_5''$ and A are as described above with a compound of the formula X—B—CH₂—NH—COO-lower alkyl  V wherein B is as described above and X is a halogen atom, preferably chlorine, bromine or iodine.

Examples of compounds of formula IV above useful in this process aspect include: 5-chloro-2-methylaminobenzophenone diethyl acetal; 5-chloro-2-methylaminobenzophenone; 2-amino-2'-fluoro-5-nitrobenzophenone; 2-amino-2'-chloro-5-nitrobenzophenone and 2-amino-5-chlorobenzophenone.

The conditions employed for the reaction between the compounds of formulae IV and V above depend primarily upon the nature of the formula V reactant. For example, where a compound of formula V in which B represents a carbonyl group is used (such as N-carbomethoxy glycine chloride), the formula IV compound is preferably treated slowly with said formula V compound in the presence of an inert organic solvent and a base. Suitable solvents for this purpose include chlorinated hydrocarbons such as methylene chloride and suitable bases include alkali metal carbonates such as sodium bicarbonate, which may be utilized in aqueous solutions and/or in solid form. Alternately, the formula IV compound can be dissolved or suspended in an inert organic solvent, preferably a chlorinated hydrocarbon such as methylene chloride, and the formula V compound added thereto. Thereafter, small amounts of a polar aprotic solvent such as dimethylformamide are added to the mixture and upon evaporation the desired products of formula Ib are obtained.

When a compound of formula V in which B represents a methylene group is used, its reaction with a compound of formula IV can be effected in the presence of a base in an inert organic solvent. Suitable bases for this reaction are inorganic bases such as sodium acetate and organic bases such as triethylamine, pyridine and the like. Suitable solvents are, for example, lower alkanols (such as methanol, ethanol, propanol and the like), aromatic hydrocarbons (such as benzene, toluene, xylene and the like), open-chain or cyclic ethers (such as diethyl ether, tetrahydrofuran, dioxane and the like) and amides (such as dimethylformamide and the like). When a compound of formula V in which X represents chlorine or bromine is used, it may be advantageous to add sodium iodide to the reaction mixture in order to replace the chlorine or bromine atom by the more reactive iodine atom. The reaction between a compound of formula IV and a compound of formula V wherein B signifies a methylene group is preferably effected at a temperature in the range of from about room temperature to the reflux temperature of the reaction mixture, most preferably in the upper region of this range.

The starting materials of formula IV in which $R_4''$ and $R_5''$ taken together signify an oxo group belong to a known class of compounds. The corresponding compounds of formula IV in which $R_4''$ and $R_5''$ each represent lower alkoxy or $R_4''$ and $R_5''$ together represent lower alkylenedioxy can be prepared from the corresponding compounds. in which $R_4''$ and $R_5''$ together represent an oxo group following conventional procedures, for example by reaction with an orthoformic acid ester (e.g. orthoformic acid triethyl ester) in a lower alkanol (e.g. methanol or ethanol) or in a lower alkylene glycol. In this reaction, it is expedient that catalytic amounts of acid (e.g. concentrated sulphuric acid) are present. A 2-formylaminoaryl ketone is obtained and the formyl group is then removed by alkaline hydrolysis (e.g. with caustic soda or caustic potash in dimethyl sulphoxide).

E. In a further process aspect of the present invention, the compounds of formula Ia are prepared by splitting off the the protecting group from a compound of the general formula

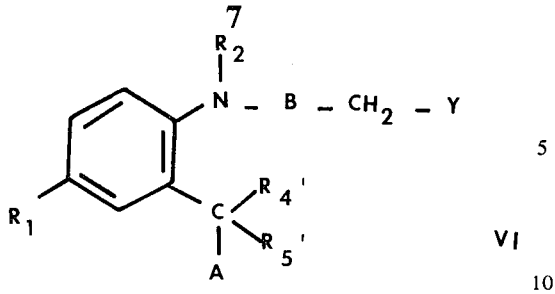

wherein $R_1$, $R_2$, $R_4'$, $R_5'$, A and B are as described above and Y represents a nitrogen atom protected by a cleavable protecting group.

Suitable protecting groups that can be utilized in this process aspect of the invention are any conventional protecting groups which can be split off under conditions which do not affect other groups present in the molecule. Especially suitable are protecting groups which can be split off under alkaline conditions; for example, lower alkoxycarbonyl groups such as methoxycarbonyl, ethoxycarbonyl and the like or other suitable acyl groups. The protecting group can also form a ring with the nitrogen atoms such as, for example, a phthalimido or succinimido group.

Choice of the protecting group used in the formation of a compound of formula VI and its splitting off is governed by the conditioning factors of the molecule. The splitting off of the protecting group can be accomplished by conventional techniques, for example, by alkaline hydrolysis. Thus, for example, the splitting off of an acyl protecting group is effected by alkaline hydrolysis. This alkaline hydrolysis is advantageously carried out by treating the compound of formula VI in a water-miscible aprotic organic solvent (e.g. dimethyl sulphoxide and the like) with aqueous caustic alkali (e.g. with 0.5–4 N caustic soda). In this procedure temperature and pressure are not critical; for example, the hydrolysis can be carried out at room termperature or at an elevated temperature (preferably at the reflux temperature of the mixture) and under normal pressure. The time required to complete the hydrolysis will, of course, depend on the temperature, the nature of the protecting group to be split off and the alkaline agent employed. As a further example, a phthalimido protecting group is advantageously split off by hydrazinolysis. This can be carried out, for example, by taking up a compound of formula VI in which Y represents a phthalimido group in a suitable organic solvent such as dioxane, adding hydrazine hydrate thereto and leaving the mixture to stand for some time at room temperature.

The compounds of formula VI used as the starting materials in this process aspect may be prepared by reacting a compound of formula IV with a compound of the formula

Z—B—CH₂—Y  VII wherein B and Y are as described above and Z represents the acid residue of a reactive ester.

An example of a compound of formula VII useful for this purpose is phthalimidoacetyl chloride. This reaction is preferably effected in the presence of an inert organic solvent and for the sake of convenience at room temperature and atmospheric pressure.

The compounds of formula VI wherein Y represents benzyloxycarbonyl can also be prepared as previously described in process aspect A using compound of formula III and chloroformic acid benzyl ester as starting materials.

F. In a further process aspect of this invention, a compound of the formula

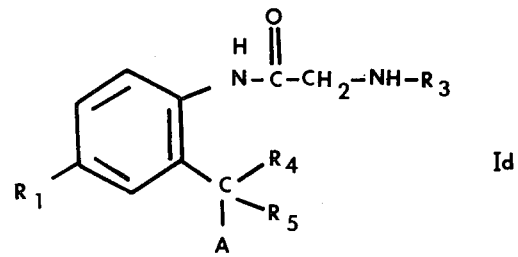

wherein $R_1$, $R_3$, $R_4$, $R_5$ and A are as described above is reacted with an alkylating, hydroxyalkylating or dialkylaminoalkylating agent to yield a compound of the formula

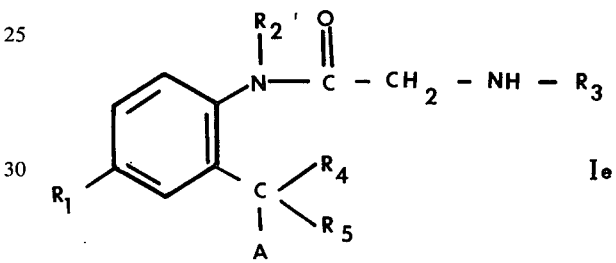

wherein $R_1$, $R_3$, $R_4$, $R_5$ and A are as described above and $R_2'$ signifies lower alkyl, hydroxy-lower alkyl or di-lower alkylamino-lower alkyl.

Suitable alkylating agents for the purposes of this process aspect of the invention include, for example, lower alkyl halides such as methyl iodide, ethyl chloride and the like, di-(lower alkyl) sulphates such as dimethyl sulphate etc., lower alkyl esters of alkane sulphonic acids or aryl sulphonic acids such as p-toluenesulphonic acid methyl ester and the like. Ethylene oxide is an example of a hydroxyalkylating agent. As dialkylamino-alkylating agents there can be used, for example, di-lower alkylamino-lower alkyl chlorides such as diethylaminoethyl chloride, dimethylaminopropyl chloride etc, di-lower alkylamino lower alkyl esters of alkane sulphonic acids or aryl sulphonic acids and the like. The treatment of a compound of formula Id with an alkylating, hydroxyalkylating or dialkylaminoalkylating agent is carried out under conditions such that a primary amino group which may be present at the terminal position of the side-chain is not, or is only insignificantly, attacked. Thus, the treatment is advantageously carried out under alkaline conditions, for example, in the presence of an alkali hydride such as sodium hydride, an alkali alkoxide such as sodium methoxide and the like in a solvent suitable for such treatment such as dimethylformamide and the like. Temperature and pressure are not critical and the reaction can be carried out at room temperature, or at temperatures below or above room temperature.

G. In yet another process aspect of this invention, the compounds of formula Ic above can be prepared by cleaving the ketal group in a corresponding compound in which $R_4$ and $R_5$ each represent lower alkoxy or taken together represent lower alkylene dioxy under acidic conditions. The cleavage of the ketal group can be effected according to conventional techniques, for example, by treatment with an aqueous mineral acid such as dilute hydrochloric acid or dilute sulfuric acid.

H. In a further process aspect, the compounds of formula Ia are prepared by reacting a compound of the general formula

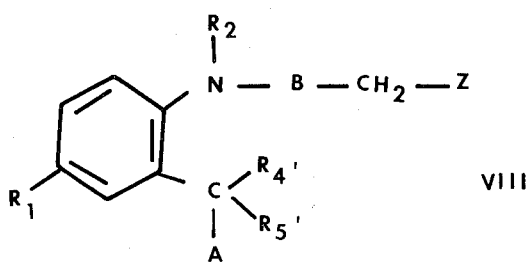

VIII wherein $R_1$, $R_2$, $R_4'$, $R_5'$, A, B and Z are described above
with ammonia.

The symbol Z in formula VIII represents an acid residue of a reactive ester, for example, chlorine, bromine or iodine, an alkylsulphonyloxy group (such as methanesulphonyloxy) or an arylsulphonyloxy group (such as benzene-, p-bromobenzene- or p-toluenesulphonyloxy) etc., which separates as a leaving group in the treatment with ammonia. The reaction of a compound of formula VIII with ammonia is advantageously effected in an inert organic solvent, for example, in a lower alkanol such as methanol, ethanol and the like, in a high-boiling ether such as tetrahydrofuran, dioxane and the like or in methylene chloride, dimethyl sulphoxide, dimethylformamide, diethylformamide etc. However, the reaction medium need not be anhydrous, and the ammonia can, for example, be employed in the form of an aqueous solution (preferably concentrated). It is also possible to use ammonia in liquid form. Where a compound of formula VIII in which Z represents chlorine, bromine, alkylsulphonyloxy or arylsulphonyloxy and the like is used as the starting material, it can be advantageous to add sodium iodide to the reaction mixture in order to replace the substituent Z by the more reactive iodine atom. In the reaction of a compound of formula VIII with ammonia, acid is released which is taken up by the ammonia used in excess. Temperature and pressure are not critical, but depend on each other as well as on the other reaction conditions. Thus, for example, the boiling point of ammonia cannot be exceeded when the reaction is carried out at normal pressure and ammonia is employed in liquid form without the addition of a solvent. Where the reaction is to be effected at a higher temperature (for example, at room temperature), a suitable solvent must be added and/or the reaction must be carried out under pressure in a closed vessel.

The compounds of formula VIII used as starting materials can be prepared by reacting a compound of formula IV above with a compound of the formula $$X-B-CH_2-Z \qquad IX$$

wherein B, X and Z are as described above.

Examples of compounds of formula IX suitable for the purpose of the process aspect include 1,2-dichloroethane, chloroacetyl chloride, bromoacetyl bromide, methanesulphonyloxyacetyl chloride, benzenesulphonyloxyacetyl bromide, p-toluenesulphonyloxyacetyl chloride and the like.

For the preparation of a compound of formula VIII in which B signifies a carbonyl group, an anhydride of a carboxylic acid of the formula $$HOOC-CH_2 - Z \qquad X$$

wherein Z is as described above
for example, chloroacetic acid anhydride, can be used in place of a compound of formula IX.

The compounds of formula I above which are basic in nature can be converted into acid addition salts, especially into pharmaceutically acceptable acid addition salts, according to generally known methods by treatment with inorganic or organic acids. Examples of inorganic and organic acids which form pharmaceutically acceptable salts are hydrochloric acid, hydrobromic acid, sulphuric acid, acetic acid, succinic acid, maleic acid, p-toluenesulphonic acid etc.

The compounds of formula I above and the pharmaceutically acceptable acid addition salts of these compounds which are basic in nature possess sedative, anti-convulsant and muscle relaxant activity.

The anti-convulsant activity of the formula I compounds is demonstrated when mice to which the test compounds have been administered are subjected to the pentamethylenetetrazole test. For example, on testing for anticonvulsant activity in the pentetrazole test according to the method of ORLOFF (*Proc. Soc. Exptl. Biol Med.*, 70, 254–257, 1949) methyl [(2-benzoyl-4-chlorphenyl)methylcarbamoyl]methyl carbamate which in mice displays an $LD_{50}$ between 1250 and 2500 mg/kg p.o. (24 hour value), exhibits an APR 2.0 of 5 mg/kg p.o. [by APR 2.0 is meant that dosage in mg/kg of an anti-convulsant which brings about double the pentetrazole comsumption compared with the untreated control group]. In a similar test, 2-amino-4'-chloro-2'-($\alpha,\alpha$-diethoxybenzyl)-N-methylacetanilide, which displays an $LD_{50}$ of 2500 mg/kg p.o., exhibits an APR 2.0 of 8 mg/kg p.o. In contrast thereto, phenobarbital, a conventional anticonvulsant, exhibits an APR 2.0 of 30 mg/kg.

The muscle relaxant and sedative activity can be demonstrated in the rotating rod test. This test involves investigating the ability of mice to remain on a slowly rotating rod while under the influence of a compound exerting muscle relaxant and/or sedative activity. The rod used is 30 mm in diameter and is rotated slowly at 2 revolutions per minute. Mice are selected which are initially able to remain on this rotating rod for at least 2 minutes. The mice are then given different doses of the product to be tested. After 30 minutes, the mice are placed on the rod again and the time that they remain on the rod is noted. The dosage of the product which produces a 50% reduction in the time spent on the rod is termed the $HD_{50}$. For example, the aforementioned methyl [(2-benzoyl-4-chlorophenyl)methylcarbamoyl]methyl carbamate exhibits an $HD_{50}$ of 5 mg/kg p.o. and 2-amino-4'-chloro-2'-($\alpha,\alpha$-diethoxybenzyl)-N-methylacetanilide exhibits an $HD_{50}$ of 15 mg/kg p.o.

The compounds of formula I and pharmaceutically acceptable acid addition salts of those compounds which are basic in nature may accordingly be used as medicaments; for example, in the form of pharmaceutical preparations which contain them in association with a compatible pharmaceutical carrier material. This carrier material may be an organic or inorganic inert carrier material which is suitable for enteral or parenteral application such as, for example, water, gelatin, lactose, starches, magnesium stearate, talc, vegetable oils, gums, polyalkylene glycols, petroleum jelly, etc. The pharmaceutical preparations can be made up in solid form (e.g. as tablets, dragees, suppositories or capsules) or in liquid form (e.g. as solution, suspensions or emulsions). They may be sterilized and/or may contain additives such as preserving, stabilizing, wetting or emulsifying agents, salts for varying the osmotic pressure or buffers. They can also contain yet other therapeutically valuable substances. Expedient pharmaceutical dosage forms contain about 1 to 200 mg of a compound of formula I. The dosage is effected according to individual requirements but, on administration to mammals, a dosage of about 0.1 mg/kg to 5 mg/kg p.o. or 0.01 mg/kg to 0.5 mg/kg i.v. per day is preferred.

The following examples further illustrate the scope of the invention.

EXAMPLE 1

28 Ml. of chloroformic acid methyl ester are added at room temperature to a solution of 24.4 g. of 7-chloro-2,3-dihydro-1-methyl-5-phenyl-1H-1,4-benzodiazepine in 200 ml. of benzene. The mixture is stirred at room temperature for 5 minutes, cooled in an ice-bath, treated with 200 ml. of 10% aqueous sodium bicarbonate solution, stirred overnight at room temperature, and subsequently treated with sodium hydroxide solution until alkaline. The benzene layer is separated off and the aqueous layer is extracted with methylene chloride. The methylene chloride extracts are combined with the benzene layer, dried over magnesium sulfate, filtered and evaporated to leave 32 g. of a crude residue.

This residue is briefly heated at 80° with 100 ml. of 6-N hydrochloric acid. The resulting mixture is cooled in an ice-bath, made alkaline with sodium carbonate and extracted with methylene chloride. The methylene chloride extract is dried over magnesium sulfate and evaporated. The residue is recrystallized from methanol/water to give methyl [2-(2-benzoyl-4-chloro-N-methylanilino)ethyl]carbamate, melting point 82°–83°.

EXAMPLE 2

56 Ml. of chloroformic acid methyl ester are added to a solution of 48.6 g. of 7-chloro-2,3-dihydro-1-methyl-5-phenyl-1H-1,4-benzodiazepine in 400 ml. of benzene. The mixture is stirred at room temperature for 5 minutes, then 400 ml. of a 10% sodium bicarbonate solution are added dropwise with ice-cooling and the mixture is stirred overnight at room temperature. The benzene layer is subsequently separated off, washed once with 10% sodium bicarbonate solution and twice with water, dired over magnesium sulfate, filtered and evaporated. The residue is treated with absolute ether. The undissolved solid is filtered off, washed four or five times with absolute ether and dried to give 7-chloro-1,2,3,5-tetrahydro-5-hydroxy-1-methyl-5-phenyl-4H-1,4-benzodiazepine-4-carboxylic acid methyl ester in the form of colorless crystals of melting point 115°–116°.

The above-obtained product is heated with hydrochloric acid and subsequently worked up in the manner described in the second paragraph of Example 1 to give methyl [2-(2-benzoyl-4-chloro-N-methylanilino)ethyl]carbamate, melting point 82°–83° (after crystallization from methanol/water).

EXAMPLE 3

A mixture of 10 g. of 7-chloro-2,3-dihydro-1-methyl-5-phenyl-1H-1,4-benzodiazepine, 30 ml. of methanol and 11.5 ml. of chloroformic acid methyl ester is stirred at room temperature. The resulting dark-red solution is cooled in an ice-bath, treated with 6 ml. of triethylamine, stirred at room temperature for 1 hour, treated with 5 ml. of chloroformic acid methyl ester and stirred at room temperature for a further hour. The resulting mixture is again cooled in an ice-bath, slowly neutralized by the addition of about 20 ml. of triethylamine, poured into 400 ml. of ice-water and stirred for 1 hour. The crystalline precipitate is filtered off and recrystallized twice from methanol to give methyl {2-[4-chloro-2-($\alpha,\alpha$-dimethoxybenzyl)-N-methylanilino]ethyl}carbamate, melting point 128°–130°.

EXAMPLE 4

7-Chloro-2,3-dihydro-1-methyl-5-phenyl-1H-1,4-benzodiazepine is reacted with chloroformic acid methyl ester in ethylene glycol in accordance with the procedure described in Example 3 to yield methyl {2-[4-chloro-N-methyl-2-(2-phenyl-1,3-dioxolan-2-yl)anilino]ethyl}carbamate. The crude product obtained is purified by chromatography on silica gel (elution with methylene chloride) and subsequently recrystallized from methanol/water; melting point 117°–120°.

EXAMPLE 5

In analogy to the procedures described in the first paragraph of Example 2, from 7-chloro-2,3-dihydro-1-methyl-5-phenyl-1H-1,4-benzodiazepine, ethanol and chloroformic acid methyl ester there is obtained 5-ethoxy-7-chloro-1,2,3,5-tetrahydro-1-methyl-5-phenyl-4H-1,4-benzodiazepine-4-carboxylic acid methyl ester which melts at 126°–128° after recrystallization from ethanol/water.

1.5 G. of 5-ethoxy-7-chloro-1,2,3,5-tetrahydro-1-methyl-5-phenyl-4H-1,4-benzodiazepine-4-carboxylic acid methyl ester are dissolved in 20 ml. of absolute ethanol, 2 ml. of saturated ethanolic hydrogen chloride solution are added and the mixture is allowed to stand for 0.5 hour, treated with ether, neutralized by the addition of 10% sodium bicarbonate solution and thoroughly shaken. The organic phase is separated off, washed with water, dried over magnesium sulfate and evaporated. After recrystallization from ethanol, the residual methyl {2-[4-chloro-2-($\alpha,\alpha$-diethoxybenzyl)-N-methylanilino]ethyl}carbamate melts at 100°–103°.

EXAMPLE 6

1.5 G. of 5-ethoxy-7-chloro-1,2,3,5-tetrahydro-2-oxo-5-phenyl-4H-1,4-benzodiazepine-4-carboxylic acid methyl ester (prepared from 7-chloro-1,3-dihydro-5-phenyl-2H-1,4-benzodiazepin-2-one, ethanol and chloroformic acid methyl ester in accordance with the procedure of the first paragraph of Example 5) are stirred overnight at room temperature in 21 ml. of absolute ethanol and 2.1 ml. of saturated ethanolic hydrogen chloride solution. A clear solution is gradually formed. This solution is treated with methylene chloride, neutralized with 10% sodium bicarbonate solution and thoroughly shaken. The organic phase is separated off, washed with water, dried over magnesium sulfate and evaporated. The residual methyl {[[4-chloro-2-($\alpha,\alpha$-diethoxybenzyl)phenyl]carbamoyl]methyl}carbamate is purified by applying to a column containing 40 g. of silica gel, eluting with methylene chloride and subsequently recrystallizing from ether; the purified product melting at 138°–140°.

EXAMPLE 7

A mixture of 10 g. of 1,3-dihydro-7-nitro-5-phenyl-2H-1,4-benzodiazepin-2-one, 10 ml. of methanol, 10 g. of chloroformic acid methyl ester, 30 ml. of methylene chloride, 15 ml. of a 10% aqueous sodium bicarbonate solution and 12 g. of solid sodium bicarbonate is vigorously stirred overnight at room temperature. 50 ml. of methylene chloride and 50 ml. of 10% sodium bicarbonate solution are subsequently added. The methylene chloride phase is separated off and the aqueous phase is extracted with methylene chloride. The methylene chloride phases are combined, dried over magnesium sulfate, filtered and evaporated. The residue is applied to a column containing 250 g. of silica gel and eluted with (methylene chloride)/(ethyl acetate) (9:1), then with (methylene chloride)/(ethyl acetate) (5:1). The methyl {[(2-benzoyl-4-nitrophenyl)carbamoyl]methyl}carbamate thus isolated melts at 144°–146° after recrystallization from methanol.

EXAMPLE 8

In analogy to the procedures described in Example 3, from 2,3-dihydro-7-nitro-5-phenyl-1H-1,4-benzodiazepine there is obtained a crude product which by chromatography on a silica gel column and elution with methylene chloride is separated into methyl {2-[2-($\alpha,\alpha$-dimethoxybenzyl)-4-nitroanilino]ethyl}carbamate of melting point 164°–165° (from methanol) and methyl [2-(2-benzoyl-4-nitroanilino)ethyl]carbamate of melting point 122°–124° (from methanol).

EXAMPLE 9

In analogy to the procedures described in Example 3, from 2,3-dihydro-1-methyl-7-nitro-5-phenyl-1,4-benzodiazepine there is obtained a crude product which by chromatography on a silica gel column and elution with (methylene chloride)/(ethyl acetate) (10:1) is separated into methyl {2-[2-($\alpha,\alpha$-dimethoxybenzyl)-N-methyl-4-nitroanilino]ethyl}carbamate of melting point 146°–148° (from methanol) and methyl[2-(2-benzoyl-N-methyl-4-nitroanilino) ethyl]carbamate of melting point 106°–108° (from methanol).

EXAMPLE 10

In analogy to the procedures set forth in Example 3, from 7-chloro-5-(o-fluorophenyl)-2,3-dihydro-1-methyl-1H-1,4-benzodiazepine there is obtained methyl {2-[4-chloro-2-(o-fluoro-$\alpha$, $\alpha$-dimethoxybenzyl)-N-methylanilino]ethyl}carbamate which melts at 124°–125° after recrystallization from methanol/water.

EXAMPLE 11

100 Mg. of 5-ethoxy-7-chloro-1,2,3,5-tetrahydro-1-methyl-2-oxo-5-phenyl-4H-1,4-benzodiazepine-4-carboxylic acid ethyl ester (manufactured in accordance with the procedure of the first paragraph of Example 5 from 7-chloro-1,3-dihydro-1-methyl-5-phenyl-2H-1,4-benzodiazepin-2-one, ethanol and chloroformic acid ethyl ester) are dissolved in 0.5 ml. of saturated ethanolic hydrogen chloride solution. The resulting solution is allowed to stand for 0.5 hour, then evaporated in a rotary evaporator. The residue is treated with sodium bicarbonate solution until alkaline, then extracted with methylene chloride. The organic phase is dried over magnesium sulfate, filtered and evaporated. The residue is recrystallized from ether/(petroleum ether) to give ethyl {[(2-benzoyl-4-chlorophenyl)methylcarbamoyl]methyl}carbamate which melts at 95°–97°.

EXAMPLE 12

In analogy to the procedures described in Example 7, from 7-chloro-1,3-dihydro-1-methyl-5-phenyl-2H-1,4-benzodiazepin-2-one there is obtained a crude product which is purified by chromatography on a silica gel column and elution with methylene chloride containing 20% ethyl acetate to give methyl {[(2-benzoyl-4-chlorophenyl)methylcarbamoyl]methyl}carbamate of melting point 110°–112°.

EXAMPLE 13

By treatment of 5-ethoxy-7-chloro-1,2,3,5-tetrahydro-2-oxo-5-phenyl-4H-1,4-benzodiazepine-4-carboxylic acid ethyl ester with ethanolic hydrochloric acid solution in accordance with the procedure described in Example 11 there is obtained a reaction mixture which is chromatographed on a silica gel column. Elution with methylene chloride yields ethyl {[(2-benzoyl-4-chlorophenyl)carbamoyl]methyl}carbamate which melts at 93°–95° after crystallization from ether/n-hexane.

EXAMPLE 14

3 G. of 7-bromo-1,3-dihydro-1-methyl-5-(2-pyridyl)-2H-1,4-benzodiazepin-2-one are stirred for 24 hours with 2.6 g. of potassium carbonate and 2.6 ml. of chloroformic acid ethyl ester in 30 ml. of methylene chloride. A further 2.6 g. of potassium carbonate and 2.5 ml. of chloroformic acid ethyl ester are then added and the mixture is stirred at room temperature for a few days, then poured into ice-water and extracted with methylene chloride. The methylene chloride extract is dried over sodium sulfate, filtered and evaporated. Recrystallization of the residue from ethyl acetate gives 5-ethoxy-7-bromo-1,2,3,5-tetrahydro-1-methyl-2-oxo-5-(2-pyridyl)-4H-1,4-benzodiazepine-4-carboxylic acid ethyl ester of melting point 220°.

When the crude product is chromatographed on silica gel and eluted with (methylene chloride)/(ethyl acetate) (10:1), in addition to the benzodiazepine-carboxylic acid derivative mentioned in the preceding paragraph there can also be isolated ethyl {[(4-bromo-2-picolinoylphenyl)methylcarbamoyl]methyl}carbamate which melts at 143° after crystallization from ether.

EXAMPLE 15

3.6 G. of 1,3-dihydro-1-methyl-7-nitro-5-phenyl-2H-1,4-benzodiazepin-2-one in 60 ml. of absolute benzene are boiled at reflux for 3 hours with 1.4 g. of chloroformic acid ethyl ester and five drops of ethanol. The resulting mixture is adjusted to pH 7–8 with triethylamine and allowed to stand for 4 days, the pH value being occasionally checked and held at 7–8 by means of triethylamine. The mixture is thereafter poured onto water and extracted with methylene chloride. The methylene chloride extract is dried over magnesium sulfate, filtered and evaporated. The residue is chromatographed on silica gel and crystallized from ligroin/(methylene chloride) to give ethyl {[(2-benzoyl-4-nitrophenyl)methylcarbamoyl]methyl}carbamate, melting point 95°–97°.

EXAMPLE 16

150 G. of 7-chloro-1,3-dihydro-5-phenyl-2H-1,4-benzodiazepin-2-one in 600 ml. of methylene chloride are stirred with 120 g. of potassium carbonate and treated dropwise at 40° with 120 ml. of chloroformic acid methyl ester. The resulting mixture is boiled at reflux for 3 hours, allowed to stand for a few days, poured into ice-water and extracted with methylene chloride. The methylene chloride extract is dried over magnesium sulfate, filtered and evaporated. The residue is taken up in a small amount of methylene chloride. The solution is filtered from the starting material which separates out. After crystallization is complete, the mother liquor is filtered over aluminum oxide and the aluminum oxide is washed with methylene chloride until the filtrate is colorless. The filtrate obtained is evaporated and the residue crystallized from ether to give 7-chloro-1,2,3,5-tetrahydro-5-methoxy-2-oxo-5-phenyl-4H-1,4-benzodiazepine-4-carboxylic acid methyl ester, melting point 240°.

From 7-chloro-1,2,3,5-tetrahydro-5-methoxy-2-oxo-5-phenyl-4H-1,4-benzodiazepine-4-carboxylic acid methyl ester in accordance with the procedure described in the second paragraph of Example 5 there is obtained a crude product which is chromatographed on silica gel. Elution with (methylene chloride)/(ethyl acetate) (10:1) yields methyl {[(2-benzoyl-4-chlorophenyl)carbamoyl]methyl}carbamate which melts at 112°–113° after crystallization from ether.

EXAMPLE 17

64 G. of 7-chloro-1,2,3,5-tetrahydro-5-hydroxy-1-methyl-5-phenyl-4H-1,4-benzodiazepine-4-carboxylic acid methyl ester are treated with 400 ml. of aqueous hydrochloric acid (1:1) and heated to 80° for 10 minutes. The resulting solution is cooled in ice and neutralized with concentrated sodium hydroxide solution. The oil which separates out is extracted with methylene chloride. The methylene chloride extract is dried over magnesium sulfate, filtered and evaporated. After crystallization from methanol/water, the residual methyl [2-(2-benzoyl-4-chloro-N-methylanilino)ethyl]carbamate melts at 80°.

EXAMPLE 18

From 7-chloro-1,3-dihydro-1-(2-hydroxyethyl)-5-phenyl-2H-1,4-benzodiazepin-2-one in accordance with the procedure described in Example 7 there is obtained a crude product which is chromatographed on silica gel with (methylene chloride)/(ethyl acetate) (10:1). The infrared spectrum of the methyl [(2-benzoyl-4-chlorophenyl)-(2-hydroxyethyl)carbamoyl]methyl carbamate has characteristic bands at 1730, 1670 and 1525 cm$^{-1}$.

EXAMPLE 19

One drop of concentrated sulfuric acid is added to 12 g. of 2-methylamino-5-chlorobenzophenone, 8.3 g. of orthoformic acid triethyl ester and 15 g. of absolute ethanol and the resulting mixture is allowed to stand at room temperature in a closed vessel for 3 weeks. The resulting solution is subsequently evaporated to dryness, the residue taken up in ether and the resulting solution is extracted with aqueous sodium bicarbonate solution. The ethereal solution is washed with water, dried over magnesium sulfate and evaporated. The residue is recrystallized from petroleum ether and from ether/(petroleum ether) to give 4'-chloro-α,α-diethoxy-N-methyl-α-phenyl-o-formotoluidide which melts at 104°–106° (with decomposition).

6 G. of 4'-chloro-α,α-diethoxy-N-methyl-α-phenyl-o-formotoluidide are heated to 120° with stirring for 2 hours with 50 ml. of dimethyl sulfoxide and 13 ml. of 28% (weight/weight) aqueous sodium hydroxide solution. The resulting mixture is poured into 300 ml. of ice-water and extracted with ether. The ether extract is dried over magnesium sulfate and evaporated. The residue is recrystallized from ethanol/water to give 5-chloro-2-methylaminobenzophenone diethyl acetal which melts at 77°–80°.

4.8 g. of N-carbomethoxyglycine, 50 ml. of methylene chloride and 7.5 g. of phosphorus pentachloride are stirred at −20° (cooling with solid carbon dioxide) until a clear solution is formed. This solution is then added dropwise to a mixture precooled to 0° of 9.6 g. of 5-chloro-2-methylaminobenzophenone diethyl acetal, 50 ml. of methylene chloride and 250 ml. of 10% aqueous sodium bicarbonate solution. The solution obtained is stirred at 0° for 15 minutes and is subsequently vigorously stirred at room temperature for 1 hour. The phases are separated. The organic phase is washed with water, dried over magnesium sulfate and evaporated. The residue is recrystallized from ethanol to give methyl {[[4-chloro-2-(α,α-diethoxybenzyl)phenyl]methylcarbamoyl]methyl}carbamate which melts at 161°–162°.

EXAMPLE 20

A solution of N-carbomethoxyglycine chloride is prepared by suspending 24 g. of N-carbomethoxyglycine in 250 ml. of absolute methylene chloride, cooling to −20°, adding 37.5 g. of phosphorus pentachloride and stirring at −20° until a clear solution is formed.

A solution of 36.8 g. of 5-chloro-2-methylaminobenzophenone in 250 ml. of methylene chloride is stirred with 1 liter of 10% sodium bicarbonate solution and cooled to 0°. The N-carbomethoxyglycine chloride solution prepared as described in the preceding paragraph is slowly added dropwise with vigorous stirring and with cooling at 0°. After the addition is completed, the temperature of the mixture is allowed to rise to room temperature, then the mixture is stirred at room temperature for a further hour. The methylene chloride phase is subsequently separated off and the aqueous phase extracted with methylene chloride. The combined methylene chloride phases are dried over magnesium sulfate, filtered and evaporated. The residue is crystallized from ether and recrystallized from ethanol to give methyl {[(2-benzoyl-4-chlorophenyl)methylcarbamoyl]methyl}-carbamate, melting point 110°–111°.

EXAMPLE 21

An N-carbomethoxyglycine chloride solution is prepared from 670 mg. of N-carbomethoxyglycine and 1.1 g. of phosphorus pentachloride in 5 ml. of methylene chloride in accordance with the procedure described in the first paragraph of Example 20.

One drop of N,N-dimethylformamide is added to a solution of 520 mg. of 2-amino-2'-fluoro-5-nitrobenzophenone in 20 ml. of methylene chloride. The N-carbomethoxyglycine chloride solution obtained as described in the preceding paragraph is then added and the resulting mixture is slowly evaporated at 60°. The residue is recrystallized from ethanol/ether to give methyl {[[2-(2-fluorobenzoyl)-4-nitrophenyl]carbamoyl]methyl}carbamate which melts at 142°.

EXAMPLE 22

An N-carbomethoxyglycine chloride solution is prepared from 5 g. of N-carbomethoxyglycine and 7.5 g. of phosphorus pentachloride in 50 ml. of methylene chloride in accordance with the procedure described in the first paragraph of Example 20.

A suspension of 8 g. of 2-amino-2'-chloro-5-nitrobenzophenone in 50 ml. of methylene chloride is treated with three drops of N,N-dimethylformamide and the resulting suspension is added to the N-carbomethoxyglycine chloride solution obtained as described in the preceding paragraph. The mixture obtained is slowly evaporated in a rotary evaporator at 40°. The residue is partitioned between methylene chloride and 10% sodium bicarbonate solution. The methylene chloride phase is separated off, dried over magnesium sulfate, filtered and evaporated. The residue is recrystallized twice from ethanol to give methyl {[[2-(2-chlorobenzoyl)-4-nitrophenyl]carbamoyl]methyl}carbamate which melts at 177°–178°.

EXAMPLE 23

In accordance with the procedure described in Example 20, from 2-amino-4-chlorobenzophenone and N-carbomethoxyglycine chloride there is obtained methyl {[(2-benzoyl-4-chlorophenyl)-carbamoyl]methyl}carbamate which when recrystallized from ethanol/ether displays a double melting of 117°/130°.

EXAMPLE 24

4 G. of N-carbomethoxyglycine in 10 ml. of methylene chloride are vigorously stirred at −20° with 6.2 g. of phosphorus pentachloride until a clear solution is formed.

10.6 G. of sodium carbonate in 20 ml. of water are added to a solution of 5.6 g. of 5-chloro-2-methylamino-2'-chlorobenzophenone in 20 ml. of methylene chloride. The resulting mixture is cooled to 0° and, with vigorous stirring, the N-carbomethoxyglycine chloride solution prepared as described in the preceding paragraph is added dropwise thereto. After 0.5 hour, the aqueous phase is separated off. The methylene chloride phase is washed with water, dried over magnesium sulfate, filtered and evaporated. The residue is crystallized from ether and recrystallized from methanol to give methyl {[[4-chloro-2-(o-chlorobenzoyl)phenyl]methylcarbamoyl]methyl}carbamate, melting point 113°–114°.

EXAMPLE 25

A N-carbomethoxyglycine chloride solution is prepared from 1.5 g. of N-carbomethoxyglycine in accordance with the procedure described in Example 24.

Five drops of N,N-dimethylformamide are added to a solution of 2.6 g. of 2-methylamino-5-nitrobenzophenone in 20 ml. of methylene chloride. The N-carbomethoxyglycine chloride solution obtained as described in the preceding paragraph is then added. The resulting mixture is evaporated in vacuo at 40° and the residue is dissolved in methylene chloride. The solution is washed with aqueous sodium carbonate solution, dried over magnesium sulfate, filtered and evaporated. The residue is chromatographed on silica gel with (methylene chloride)/(ethyl acetate) (9:1) and crystallized from ether to give methyl {[(2-benzoyl-4-nitrophenyl)methylcarbamoyl]methyl}carbamate, melting point 112°–113°.

EXAMPLE 26

From 2'-chloro-2-methylamino-4-nitrobenzophenone in accordance with the procedure described in Example 25 there is obtained methyl {[[2-(o-chlorobenzoyl)-4-nitrophenyl]methylcarbamoyl]methyl}carbamate which melts at 90°–92° after chromatographic purification on silica gel and crystallization from (methylene chloride)/ether.

EXAMPLE 27

From 4-chloro-2'-fluoro-2-methylaminobenzophenone in accordance with the procedure described in Example 25 there is obtained methyl {[[4-chloro-2-(o-fluorobenzoyl)phenyl]methylcarbamoyl]methyl}carbamate which melts at 100° after recrystallization from ether/(petroleum ether).

EXAMPLE 28

From 4-chloro-2-(2-diethylaminoethyl)-2'-fluorobenzophenone in accordance with the procedure described in Example 25 there is obtained methyl {[[4-chloro-2-(o-fluorobenzoyl)phenyl](2-diethylaminoethyl)carbamoyl]methyl}carbamate. The infrared spectrum of the compound displays characteristic bands at 1727 and 1676 cm$^{-1}$. Nuclear magnetic resonance spectrum: triplet of 6 protons at 1 ppm; multiplet of 6 protons at 2.6 ppm; multiplet of 2 protons at 3.2 ppm.

EXAMPLE 29

From 2-(2-amino-5-bromobenzoyl)pyridine in accordance with the procedure described in Example 25 there is obtained methyl {[(4-bromo-2-picolinoylphenyl-carbamoyl]methyl}carbamate which melts at 163° after crystallization from ethanol.

EXAMPLE 30

From 2-(5-bromo-2-methylaminobenzoyl)pyridine in accordance with the procedure described in Example 25 there is obtained methyl {[(4-bromo-2-picolinoylphenyl)methylcarbamoyl]methyl}carbamate which melts at 111°–112° after crystallization from ether/(petroleum ether).

EXAMPLE 31

4.3 G. of 2-(2-methylamino-5-bromobenzoyl)pyridine, 7.5 ml. of absolute ethanol, 2.6 g. of orthoformic acid ethyl ester and three drops of concentrated sulfuric acid are heated at reflux for 5 hours, allowed to stand overnight at room temperature, poured into ice-cooled aqueous sodium carbonate solution and extracted with ether. The ether extract is washed with water, dried over magnesium sulfate, filtered and evaporated. The residue is applied to a silica gel column and eluted with methylene chloride and then with methylene chloride containing 40% ethyl acetate. After crystallization from petroleum ether, the resulting 4'-bromo-2'-(diethoxy-2-pyridyl-methyl)-N-methylformanilide melts at 113°–115°.

In accordance with the second paragraph of Example 19, from 4'-bromo-2'-(diethoxy-2-pyridyl-methyl)-N-methylformanilide there is obtained 5-bromo-2-methylaminophenyl 2-pyridyl ketone diethyl acetal which melts at 106°–108° after crystallization from petroleum ether.

In accordance with the procedure described in the third paragraph of Example 19, from 5-bromo-2-methylaminophenyl 2-pyridyl ketone diethyl acetal there is obtained methyl {[[4-bromo-2-(diethoxy-2-pyridyl-methyl)phenyl]methylcarbamoyl]-methyl}carbamate which melts at 132°–134° after crystallization from ether/(petroleum ether).

EXAMPLE 32

From 5-chloro-2-(2-hydroxyethylamino)benzophenone, in accordance with the procedure described in Example 24 there is obtained methyl {[(4-chloro-2-benzoyl)-(2-hydroxyethyl)carbamoyl]-methyl}carbamate which is chromatographed on a silica gel column with (methylene chloride)/(ethyl acetate) (3:1) and then with ethyl acetate. The infrared spectrum of the compound obtained displays characteristic bands at 1726 and 1672 cm$^{-1}$.

EXAMPLE 33

15 g. of methyl {2-[4-chloro-2-($\alpha,\alpha$-dimethoxybenzyl)-N-methylanilino]ethyl}carbamate, 240 ml. of dimethyl sulfoxide and 60 ml. of 2-N sodium hydroxide solution are heated with stirring at 100° (oil-bath temperature). A clear solution is formed after a short time. This solution is heated at 80° (oil-bath temperature) with stirring for 2 hours, then poured into 3500 ml. of ice-water and repeatedly extracted with ether. The combined ether extracts are washed three times with water, dried over magnesium sulfate and evaporated. The residual crystalline N-[4-chloro-2-($\alpha,\alpha$-dimethoxybenzyl)phenyl]-N-methylethylendiamine has a melting point of 81°–85°. This melting point is not changed by recrystallization from methanol/water.

By neutralization of the free base with the equimolar amount of a 0.1-N solution of hydrogen chloride in absolute methanol there is obtained the corresponding hydrochloride which melts at 100° (with decomposition) after crystallization from methanol/ether.

EXAMPLE 34

From methyl {2-[4-chloro-2-($\alpha,\alpha$-diethoxybenzyl)-N-methylanilino]ethyl}carbamate, by treatment with sodium hydroxide in dimethyl sulfoxide in accordance with the procedure described in the first paragraph of Example 33, there is obtained N-[4-chloro-2-($\alpha,\alpha$-diethoxybenzyl)phenyl]-N-methylethylendiamine which melts at 65° after recrystallization from ethanol/water.

The hydrochloride of this compound prepared in accordance with the procedure described in the second paragraph of Example 33 melts at 170° (with decomposition) after crystallization from ethanol/ether.

EXAMPLE 35

14.8 g. of methyl {[[4-chloro-2-($\alpha,\alpha$-diethoxybenzyl)phenyl]-methylcarbamoyl]methyl}carbamate, 120 ml. of dimethyl sulfoxide and 30 ml. of 2-N sodium hydroxide solution are stirred at 80° for 1 hour, then poured into 200 ml. of ice-water and extracted with two 100 ml. portions of methylene chloride. The combined methylene chloride extracts are washed 5 or 6 times with water, dried over magnesium sulfate and evaporated. The residual 2-amino-4'-chloro-2'-($\alpha,\alpha$-diethoxybenzyl)-N-methylacetanilide melts at 158°–159° after recrystallization from ethyl acetate.

EXAMPLE 36

From methyl {2-[4-chloro-N-methyl-2-(2-phenyl-1,3-dioxolan-2-yl)anilino]ethyl}carbamate, in accordance with the procedure described in the first paragraph of Example 33, there is obtained N-[4-chloro-2-(2-phenyl-1,3-dioxolan-2-yl)phenyl]-N-methylethylendiamine which melts at 82°–84° after crystallization from ether/(petroleum ether).

EXAMPLE 37

From methyl {2-[2-($\alpha,\alpha$-dimethoxybenzyl)-4-nitroanilino]-ethyl}carbamate, in accordance with the procedure described in the first paragraph of Example 33 there is obtained N-[2-($\alpha,\alpha$-dimethoxybenzyl)-4-nitrophenyl]ethylendiamine which melts at 150°–152° after crystallization from methanol/water.

EXAMPLE 38

From methyl {2-[4-chloro-2-(o-fluoro-$\alpha,\alpha$-dimethoxybenzyl)-N-methylanilino]ethyl}carbamate, in accordance with the procedure described in the first paragraph of Example 33, there is obtained N-[4-chloro-2-(o-fluoro-$\alpha,\alpha$-dimethoxybenzyl)phenyl]-N-methylethylendiamine, the infrared spectrum of which displays a characteristic band at 1057 cm$^{-1}$.

EXAMPLE 39

From methyl {2-[2-($\alpha,\alpha$-dimethoxybenzyl)-N-methyl-4-nitroanilino]ethyl}carbamate, in accordance with the procedure described in the first paragraph of Example 33, there is obtained N-[2-($\alpha,\alpha$-dimethoxybenzyl)-4-nitrophenyl]-N-methylethylendiamine, the infrared spectrum of which displays characteristic bands at 1110 and 1054 cm$^{-1}$.

EXAMPLE 40

From phthalimidoacetyl chloride and 5-chloro-2-methylaminobenzophenone diethyl acetal, in accordance with the procedure described in Example 19, there is obtained N-{[[4-chloro-2-($\alpha,\alpha$-diethoxybenzyl)phenyl]methylcarbamoyl]methyl}phthalimide which melts at 176° after crystallization from ether.

10 mg. of {N-[[4-chloro-2-($\alpha,\alpha$-diethoxybenzyl)phenyl]methylcarbamoyl]methyl}phthalimide are dissolved in 1 ml. of dioxane and treated with 2 drops of hydrazine hydrate, allowed to stand at room temperature for 3–4 hours, poured into water and extracted with methylene chloride. The methylene chloride solution is dried over magnesium sulfate, filtered and evaporated. The residue is crystallized from ether to give 2-amino-4'-chloro-2'-($\alpha,\alpha$-diethoxybenzyl)-N-methylacetanilide, melting point 156°.

EXAMPLE 41

From methyl {[[4-bromo-2-(diethoxy-2-pyridylmethyl)phenyl]-methylcarbamoyl]methyl}carbamate, in accordance with the procedure described in Example 35, there is obtained 2-amino-N-[4-bromo-2-(diethoxy-2-pyridyl-methyl)phenyl]-N-methylacetamide which melts at 148°–150° after crystallization from ether.

EXAMPLE 42

100 G. of 7-chloro-1,3-dihydro-5-phenyl-2H-1,4-benzodiazepin-2-one, 500 ml. of methylene chloride, 50 ml. of ethanol and 80 g. of potassium carbonate are stirred at room temperature and treated dropwise with 100 ml. of chloroformic acid benzyl ester. The resulting mixture is stirred overnight at room temperature, then poured into ice-water and extracted with methylene chloride. The methylene chloride extract is washed with water, dried over magnesium sulfate, filtered and evaporated. The residue is chromatographed on silica gel with methylene chloride to give 5-ethoxy-7-chloro-1,2,3,5-tetrahydro-2-oxo-5-phenyl-4H-1,4-benzodiazepine-4-carboxylic acid benzyl ester which melts at 210°–212° after crystallization and recrystallization from ether/(petroleum ether).

From 5-ethoxy-7-chloro-1,2,3,5-tetrahydro-2-oxo-5-phenyl-4H-1,4-benzodiazepine-4-carboxylic acid benzyl ester, in accordance with the procedure described in Example 6, there is obtained benzyl {[[4-chloro-2-(α,α-diethoxybenzyl)phenyl]carbamoyl]methyl}carbamate which melts at 120°–123° after chromatography on a silica gel column with (methylene chloride)/(ethyl acetate) (20:1) and crystallization from ether/(petroleum ether).

150 mg. of benzyl {[[4-chloro-2-(α,α-diethoxybenzyl)phenyl]-carbamoyl]methyl}carbamate are dissolved in 15 ml. of absolute ethanol, 50 mg. of 5% palladium-charcoal are added and the mixture is hydrogenated at room temperature and normal pressure. After 1 hour, the palladium-charcoal is filtered off, the filtrate evaporated and the residue taken up in methylene chloride. The solution is washed with 10% sodium bicarbonate solution, dried over magnesium sulfate, filtered and evaporated. The residue is crystallized from ether/(petroleum ether) and then melts at 124°–126°; the infrared spectrum displays characteristic bands at 3414, 3294, 1677, 1527 and 1077 cm$^{-1}$. According to the mass spectrum, the residue contains a mixture of 2-amino-4'-chloro-2'-(α,α-diethoxybenzyl)-acetanilide and the corresponding 4'-unsubstituted compound.

EXAMPLE 43

1 g. of methyl {[(2-benzoyl-4-chlorophenyl)carbamoyl]methyl}carbamate is dissolved in 7 ml. of N,N-dimethylformamide, treated with 200 mg. of sodium methylate at −40° and stirred for 0.5 hour. 500 Mg. of methyl iodide are then added and the mixture is left overnight in the deep-freeze, neutralized with glacial acetic acid, poured into about 10% aqueous sodium bicarbonate solution and extracted with ether. The ether extract is washed three times with water, dried over magnesium sulfate, filtered and evaporated. Most of the unreacted starting material is removed by crystallization. The residue remaining after evaporation of the mother liquor is chromatographed on a silica gel column with methylene chloride to give methyl {[[(2-benzoyl-4-chlorophenyl)methylcarbamoyl]methyl-} carbamate which melts at 106°–107° after recrystallization from ethanol.

EXAMPLE 44

From methyl {[(2-benzoyl-4-nitrophenyl)carbamoyl]methyl}carbamate, in accordance with the procedure described in Example 43, there is obtained methyl [(2-benzoyl-4-nitrophenyl)methylcarbamoyl]-methyl carbamate which melts at 110°–112° after chromatography on silica gel with methylene chloride and crystallization from ether.

EXAMPLE 45

10 mg. of methyl [[4-chloro-2-(α,α-diethoxybenzyl)phenyl]methylcarbamoyl]methyl carbamate are dissolved in 1 ml. of ethanol and treated with 2 drops of ethanolic hydrochloric acid. The resulting mixture is slightly heated, shaken, treated with water and extracted with methylene chloride. The extract is dried over magnesium sulfate, filtered and evaporated to yield methyl {[(2-benzoyl-4-chlorophenyl)methylcarbamoyl]methyl}carbamate which melts at 110° after crystallization from ethanol.

EXAMPLE 46

1 G. of 5-chloro-2-methylaminobenzophenone diethyl acetal is dissolved in 10 ml. of methylene chloride, overlaid with 10 ml. of about 10% sodium carbonate solution and treated with vigorous stirring with 0.6 ml. of bromoacetyl bromide. After 0.5 hour, the organic phase is separated off, washed with water, dried over magnesium sulfate, filtered and evaporated. After crystallization from ether, the residual 2-bromo-4'-chloro-2'-(α,α-diethoxybenzyl)-N-methylacetanilide melts at 141°.

300 Mg. of 2-bromo-4'-chloro-2'-(α,α-diethoxybenzyl)-N-methylacetanilide are dissolved in 2 ml. of N,N-dimethylformamide and treated with a trace of sodium iodide. Gaseous ammonia is then conducted with stirring into the mixture at room temperature. The mixture is subsequently allowed to stand overnight, poured into water and extracted with methylene chloride. The methylene chloride solution is washed twice with water, dried over magnesium sulfate, filtered and evaporated. The residue is treated with ether. The material which crystallizes out is filtered off. The filtrate is concentrated and the residue treated with cyclohexane. The resulting solid is recrystallized from ethyl acetate to give 2-amino-4'-chloro-2'-(α,α-diethoxybenzyl)-N-methylacetanilide of melting point 156°–158°.

EXAMPLE 47

960 Mg. of 5-chloro-2-methylaminobenzophenone diethyl acetal are dissolved in 10 ml. of absolute benzene. At room temperature, the solution is treated with 96 ml. of triethylamine and 570 mg. of chloroacetic acid anhydride and allowed to stand overnight. It is subsequently evaporated and the residue taken up in benzene. The solution obtained is treated with active charcoal, filtered and evaporated. The residue is chromatographed on silica gel and eluted with methylene chloride to give 2-chloro-4'-chloro-2'-(α,α-diethoxybenzyl)-N-methylacetanilide which melts at 170° after crystallization from ether.

By treatment of 2-chloro-4'-chloro-2'-(α,α-diethoxybenzyl)-N-methylacetanilide with ammonia in accordance with the procedure described in Example 46, there is obtained 2-amino-4'-chloro-2'-(α,α-diethoxybenzyl)-N-methylacetanilide which melts at 158°–159° after recrystallization from ethyl acetate.

EXAMPLE 48

Methyl {[(2-benzoyl-4-chlorophenyl)methylcarbamoyl]methyl}carbamate was prepared in the form of several pharmaceutical formulations as follows:

A. Tablet Formulation

Tablets each containing 10 mg. of methyl {[(2-benzoyl-4-chlorophenyl)methylcarbamoyl]methyl}carba-

UNITED STATES PATENT OFFICE
CERTIFICATE OF CORRECTION

PATENT NO. : 3,927,010
DATED : December 16, 1975
INVENTOR(S) : Joseph Hellerbach and Andre Szente It is certified that error appears in the above-identified patent and that said Letters Patent are hereby corrected as shown below:

Column 24, lines 5-10, the formula

" 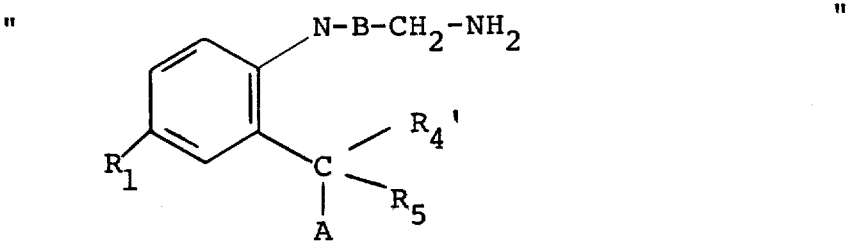 "

Should be

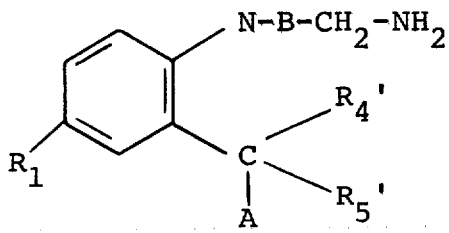

Signed and Sealed this

Thirty-first Day of August 1976

[SEAL]

Attest:

RUTH C. MASON
*Attesting Officer*

C. MARSHALL DANN
*Commissioner of Patents and Trademarks*